United States Patent
Lee et al.

(10) Patent No.: US 10,595,325 B2
(45) Date of Patent: Mar. 17, 2020

(54) METHOD FOR TRANSMITTING AND RECEIVING TERMINAL GROUPING INFORMATION IN NON-ORTHOGONAL MULTIPLE ACCESS SCHEME

(71) Applicant: LG ELECTRONICS INC., Seoul (KR)

(72) Inventors: Hojae Lee, Seoul (KR); Hyunsoo Ko, Seoul (KR); Kukheon Choi, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,014

(22) PCT Filed: Jan. 8, 2016

(86) PCT No.: PCT/KR2016/000171
§ 371 (c)(1),
(2) Date: Jan. 4, 2018

(87) PCT Pub. No.: WO2017/018620
PCT Pub. Date: Feb. 2, 2017

(65) Prior Publication Data
US 2018/0206250 A1    Jul. 19, 2018

Related U.S. Application Data
(60) Provisional application No. 62/196,313, filed on Jul. 24, 2015.

(51) Int. Cl.
*H04W 72/10* (2009.01)
*H04W 72/12* (2009.01)
(Continued)

(52) U.S. Cl.
CPC ......... *H04W 72/121* (2013.01); *H04L 5/0051* (2013.01); *H04L 5/0062* (2013.01);
(Continued)

(58) Field of Classification Search
CPC ... H04W 72/121; H04L 5/0051; H04L 5/0094
See application file for complete search history.

(56) References Cited

U.S. PATENT DOCUMENTS

2004/0213360 A1* 10/2004 McElwain ........... H04B 1/7105
                                                                    375/340
2006/0098570 A1*  5/2006 Hadad .................. H04L 5/0007
                                                                    370/210
(Continued)

FOREIGN PATENT DOCUMENTS

KR    1020140125643    10/2014

OTHER PUBLICATIONS

PCT International Application No. PCT/KR2016/000171, Written Opinion of the International Searching Authority dated Apr. 22, 2016, 16 pages.
(Continued)

*Primary Examiner* — Khaled M Kassim
*Assistant Examiner* — Syed Ali
(74) *Attorney, Agent, or Firm* — Lee Hong Degerman Kang Waimey (57) ABSTRACT

A method by which a base station transmits terminal grouping information in a non-orthogonal multiple access scheme can comprise the steps of: grouping terminals sharing the same frequency resource on the basis of any one of a data transmission rate requested by each terminal, scheduling impartiality among the terminal, and a timing distance of each terminal; and allocating reference symbols for each grouped terminal group such that the reference symbols do not overlap for each terminal group in a time domain.

6 Claims, 8 Drawing Sheets

(51) Int. Cl.
*H04L 5/00* (2006.01)
*H04L 25/02* (2006.01)

(52) U.S. Cl.
CPC ........ *H04L 5/0094* (2013.01); *H04L 25/0226* (2013.01); *H04L 25/0228* (2013.01); *H04W 72/1273* (2013.01); *H04L 5/0048* (2013.01); *H04W 72/1289* (2013.01)

(56) References Cited

U.S. PATENT DOCUMENTS

| | | | | |
|---|---|---|---|---|
| 2006/0100828 | A1* | 5/2006 | Lee | G01H 3/08 702/190 |
| 2006/0114826 | A1* | 6/2006 | Brommer | H04J 3/1682 370/230 |
| 2006/0115026 | A1* | 6/2006 | MacLeod | H04B 1/7105 375/343 |
| 2006/0198455 | A1* | 9/2006 | Fujii | H04L 1/0006 375/260 |
| 2014/0050279 | A1 | 2/2014 | Kishiyama | |
| 2014/0071952 | A1* | 3/2014 | Kim | H04L 5/001 370/335 |
| 2017/0150480 | A1* | 5/2017 | Kim | H04W 72/02 |
| 2017/0373743 | A1* | 12/2017 | Park | H04L 25/02 |
| 2018/0109410 | A1* | 4/2018 | Kim | H04L 7/041 |
| 2018/0294848 | A1* | 10/2018 | Park | H04B 7/0417 |
| 2018/0309496 | A1* | 10/2018 | Lee | H04L 5/0044 |
| 2018/0332576 | A1* | 11/2018 | Oh | H04W 16/14 |
| 2018/0338319 | A1* | 11/2018 | Kim | H04W 76/14 |
| 2018/0352457 | A1* | 12/2018 | Kim | H04W 52/365 |

OTHER PUBLICATIONS

Mediatek, "Further Details on Target Scenarios for MUST Evaluation", 3GPP TSG RAN WG1 Meeting #81, R1-153040, May 2015, 5 pages.

ZTE, "Traffic Model for Multiuser Superposition Transmission", 3GPP TSG RAN WG1 Meeting #81, R1-152973, May 2015, 5 pages.

Huawei, et al., "Link-level configurations of MUST schemes in MIMO transmission", 3GPP TSG RAN WG1 Meeting #81, R1-153202, May 2015, 4 pages.

* cited by examiner

METHOD FOR TRANSMITTING AND RECEIVING TERMINAL GROUPING INFORMATION IN NON-ORTHOGONAL MULTIPLE ACCESS SCHEME

CROSS-REFERENCE TO RELATED APPLICATIONS

This application is the National Stage filing under 35 U.S.C. 371 of International Application No. PCT/KR2016/000171, filed on Jan. 8, 2016, which claims the benefit of U.S. Provisional Application No. 62/196,313, filed on Jul. 24, 2015, the contents of which are all hereby incorporated by reference herein in their entirety.

TECHNICAL FIELD

The present invention relates to wireless communication, and more particularly, to a method for transmitting and receiving UE grouping information in a non-orthogonal multiple access system.

BACKGROUND ART

In a next generation 5G system, a wireless sensor network (WSN), which intermittently transmits a small packet by targeting massive connection/low cost/low power services, massive machine type communication (MTC), etc. are considered. In case of massive MTC service, connection density requirement is very restrictive, whereas data rate and end-to-end (E2E) latency requirement are very free (for example, connection density: up to 200,000/km2, E2E latency: seconds to hours, DL/UL data rate: typically 1-100 kbps).

Generally, connection density is determined by the number of UEs that may be supported. However, since a configuration scheme of reference symbols should maintain low cross correlation between sequences, the number of sequences that may be supported at the same time is restrictive. For example, in case of legacy LTE uplink system, demodulation reference signal (DMRS) may include 17 group hopping patterns and 30 sequence shift patterns. Therefore, to support massive connectivity, a reference signal hopping scheme for more connection density support is required. However, a UE grouping scheme and a reference signal hopping scheme of a non-orthogonal multiple access system for massive connectivity support of a next generation 5G system have not been suggested up to now.

DISCLOSURE

Technical Problem

An object of the present invention is to provide a method for transmitting UE grouping information from a base station in a non-orthogonal multiple access system.

Another object of the present invention is to provide a method for receiving UE grouping information in a UE of a non-orthogonal multiple access system.

Still another object of the present invention is to provide a base station for transmitting UE grouping information in a non-orthogonal multiple access system.

Further still another object of the present invention is to provide a UE for receiving UE grouping information in a non-orthogonal multiple access system.

It will be appreciated by persons skilled in the art that the objects that could be achieved with the present invention are not limited to what has been particularly described herein above and the above and other objects that the present invention could achieve will be more clearly understood from the following detailed description.

Technical Solution

To achieve one object of the present invention, a method for transmitting UE grouping information in a non-orthogonal multiple access scheme by a base station comprises grouping UEs sharing a same frequency resource based on one of a required data transmission rate of each of the UEs, scheduling fairness of each of the UEs, and a timing distance of each of the UEs; and allocating a reference symbol for each UE group such that a reference symbol does not overlap for each UE group in a time domain. The grouping step may further include a grouping by manner of configuring a group, which requires a highest data transmission rate, to a most significant group and configuring a group, which requires a lowest data transmission rate, to a least significant group, in accordance with the required data transmission rate of each of the UEs.

The grouping step may further include a grouping by manner of configuring a group, which requires scheduling the most, to a most significant group and configuring a group, which requires scheduling the least, to a least significant group, based on the scheduling fairness of each of the UEs.

The grouping step may further include a grouping by manner of configuring a group having a farthest timing distance to a most significant group and configuring a group having a shortest timing distance to a least significant group, based on the timing distance of each of the UEs.

The method may further comprise allocating most data symbols to the most significant group and allocating least data symbols to the least significant group.

The method may further comprise allocating a null symbol to a specific time region with respect to a lower group lower than a specific higher group if reference symbol is allocated to the specific time region with respect to the specific higher group. The method may further comprise transmitting, to the UE, a group index of group which the UEs are grouped, a modulation and coding scheme (MCS) index and control information for the non-orthogonal multiple access.

To achieve another object of the present invention, a method for receiving UE grouping information in a non-orthogonal multiple access scheme by a user equipment (UE) comprises the steps of: receiving information of a group which UEs are grouped, from a base station; mapping a reference symbol and data symbol into resources based on the information of the group; and transmitting uplink data to the base station based on the mapping, wherein the grouping is performed in such a manner that UEs sharing same frequency resource is grouped based on one of a required data transmission rate of each of the UEs, a scheduling fairness of each of the UEs, and a timing distance of each of the UEs, and the reference symbol is mapped into symbol, which does not overlap with reference symbols of other group, in a time domain.

To achieve still another object of the present invention, a base station for transmitting UE grouping information in a non-orthogonal multiple access scheme comprises a processor configured to perform grouping of UEs sharing same frequency resource based on one of a required data transmission rate of each of the UEs, scheduling fairness of each of the UEs, and a timing distance of each of the UEs, and allocate a reference symbol for each UE group such that the reference symbol does not overlap for each UE group in a time domain.

To achieve further still another object of the present invention, a user equipment (UE) for receiving UE grouping information in a non-orthogonal multiple access scheme comprises a receiver configured to receive information of a group which UEs are grouped, from a base station; a processor configured to map a reference symbol and data symbol into resources based on the group information; and a transmitter configured to transmit uplink data to the base station based on the mapping, wherein the grouping is performed in such a manner that UEs sharing same frequency resource are grouped based on one of a required data transmission rate of each of the UEs, scheduling fairness of the each of the UEs, and a timing distance of each of the UEs, and the processor is configured to map a reference symbol into symbol, which does not overlap with the reference symbol of other group, in a time domain.

Advantageous Effects

A non-orthogonal multi-group multiple access system which enables demodulation while supporting a maximum number of sequence based reference symbols may be performed.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 1:
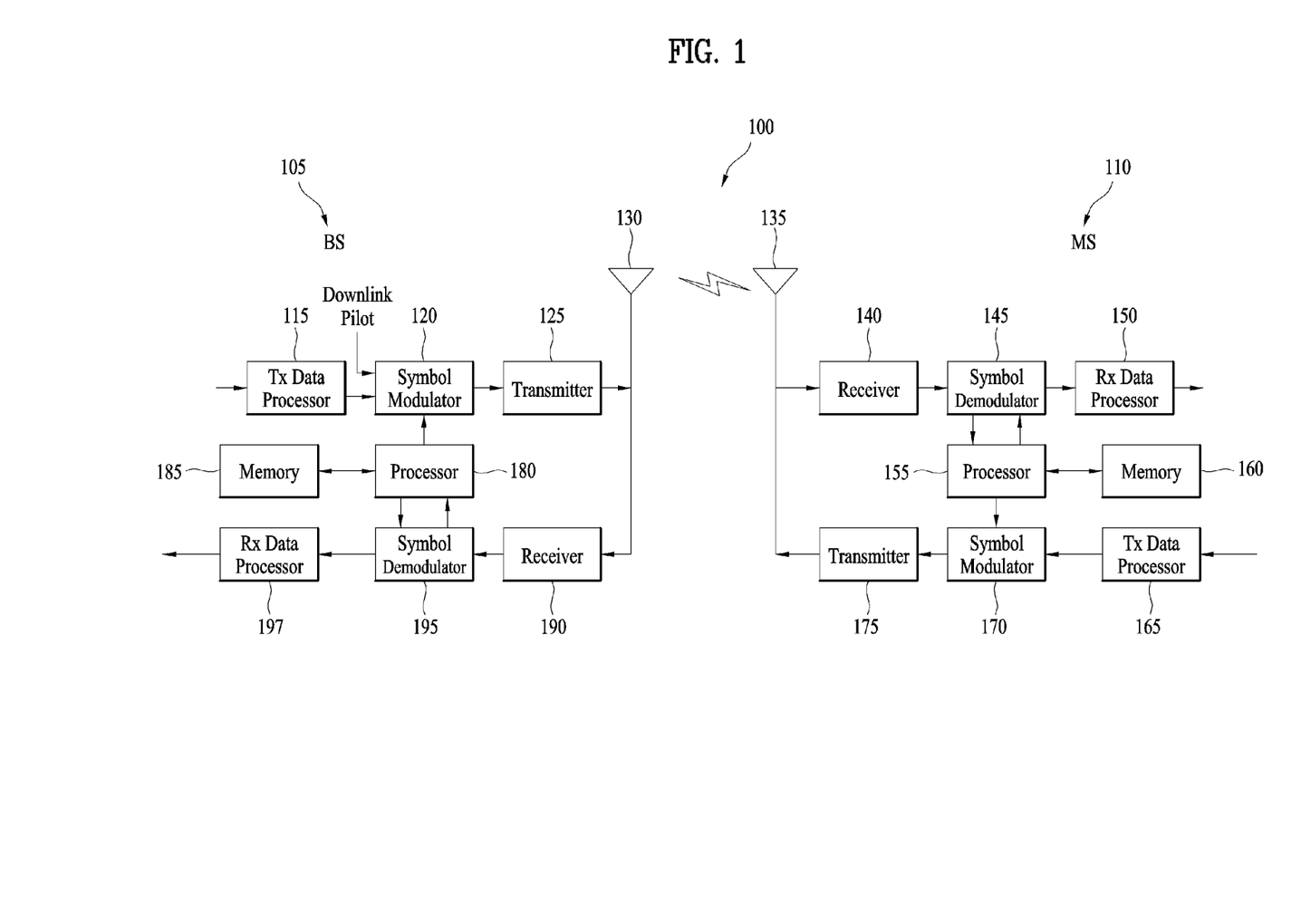
FIG. 1 is a block diagram illustrating a configuration of a base station 105 and a user equipment 110 in a wireless communication system.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention suggests a scheme related to user (or UE) grouping and reference signal hopping (RS hopping) of a non-orthogonal multiple access (NOMA) system for supporting massive connectivity.

Figure 2:
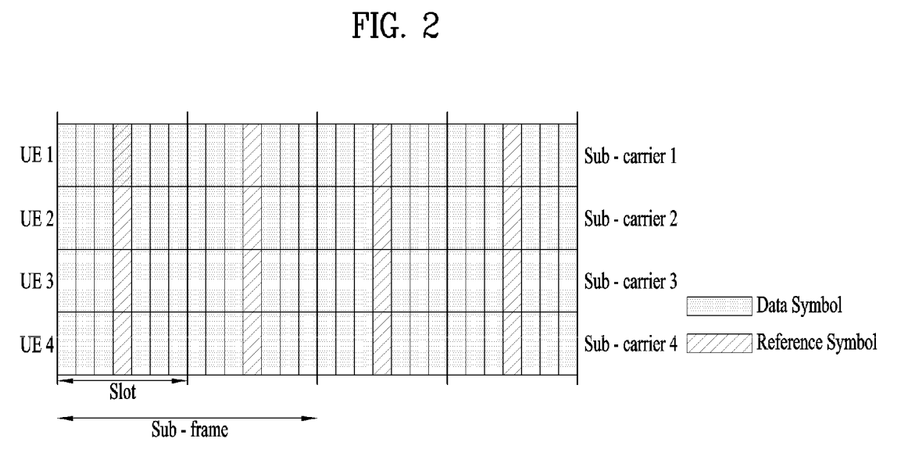
FIG. 2 illustrates a frame structure for uplink support in a long term evolution (LTE)/LTE-Advanced (LTE-A) system.

FIG. 2 illustrates a frame structure for uplink support in a long term evolution (LTE)/LTE-Advanced (LTE-A) system.

In FIG. 2, data symbols may include a PUSCH (Physical Uplink Shared Channel) or a PUCCH (Physical Uplink Control Channel). Reference symbols may include a DMRS, etc. The frame structure of FIG. 2 may be various depending on an environment of the wireless communication system. That is, a structure of subframes, a slot length, and the number of symbols within a slot may be varied. Also, the frame structure may be used for an ad-hoc network such as D2D (Device to Device) UE for performing direct communication between UEs or V2X (Vehicular to Everything) and a cellular based system such as LTE-A and MTC (Machine Type Communication). In the legacy wireless communication system, time-frequency resources may be allocated to a UE, and data symbols and reference symbols may be used differently from each other through usage of orthogonal resources. Therefore, a signal of each UE may be demodulated without interference from another UE.

Figure 3:
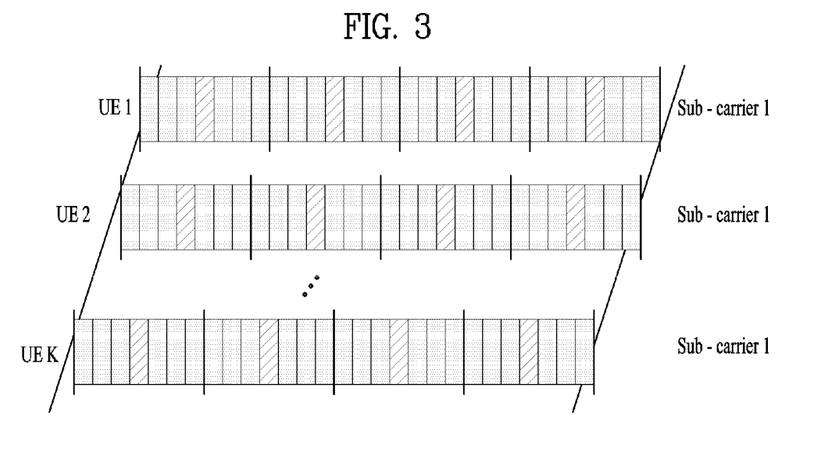
FIG. 3 illustrates a frame structure for a non-orthogonal multiple access system based multi-user data overlapping transmission scheme.

FIG. 3 illustrates a frame structure for a non-orthogonal multiple access system based multi-user data overlapping transmission scheme.

The frame structure of FIG. 3 is the same as that of FIG. 2 except that a plurality of UEs (or users) share the same frequency resource to allocate non-orthogonal time-frequency resources to other UEs (or users). For example, UE K uses the same frequency resource subcarrier 1 (Subcarrier 1) in UE 1 as illustrated in FIG. 3, whereby data symbols are overlapped with the reference symbols.

The reference symbols use auto-correlation and cross-correlation characteristics of sequence for channel coefficient estimation. If low cross-correlation is applied among a plurality of sequences, the receiver may identify the overlapped reference symbols of the plurality of UEs. For example, each UE may configure reference symbols on the basis of Zadoff-Chu sequence which is one of CAZAC sequence and then transmit the reference symbols through overlap. In accordance with the configuration of the sequences, the overlapped reference symbols of a plurality of UEs may be demodulated perfectly, or may be demodulated at very low interference.

Figure 4:
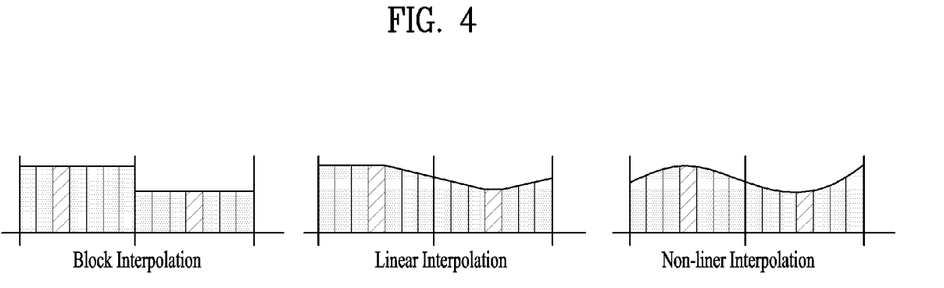
FIG. 4 is an exemplary view illustrating interpolation methods for channel estimation.

FIG. 4 is an exemplary view illustrating interpolation methods for channel estimation.

Channel estimation may be performed for the demodulated reference symbols by interpolation methods as illustrated in FIG. 4. Different interpolation methods may be configured depending on a system environment or coherence time, and may be configured by a frame structure based on a configuration of normal CP (cyclic prefix) or extended CP.

Multiuser detection (MUD) may be performed for the data symbols on the basis of channel estimation according to the reference symbols through a receiver that supports NOMA. For example, Maximum Likelihood (ML) detection or Maximum joint A posteriori Probability (MAP), Codeword Interference Cancellation (CWIC) of Multiuser Superposition Transmission (MUST), Massage Passing Algorithm (MPA) of Sparse Code Multiple Access (SCMA), Parallel Interference Cancellation (PIC) of Interleave Division Multiple Access (IDMA), etc. may be used. MUD scheme of the data symbols may be defined in various manners in accordance with a non-orthogonal multiple access transmission and reception design system.

Since the non-orthogonal multiple access system transmits signals of a plurality of UEs to the same time-frequency resource through by overlapping the signals, the non-orthogonal multiple access system has a higher decoding error rate than the LTE system but may support higher frequency usage efficiency or more connectivity. The non-orthogonal multiple access system may achieve higher frequency usage efficiency or more connectivity while maintaining a decoding error rate through control of a coding rate, in accordance with a system environment.

As described above, the present invention is intended to suggest a UE grouping scheme and a reference signal hopping scheme of a non-orthogonal multiple access system for support of massive connectivity.

Reference Signal Hopping Method for Massive Connectivity

To support massive connectivity, a multiple access system that enables demodulation while supporting a maximum number of sequence based reference symbols or more is required.

Figure 5:
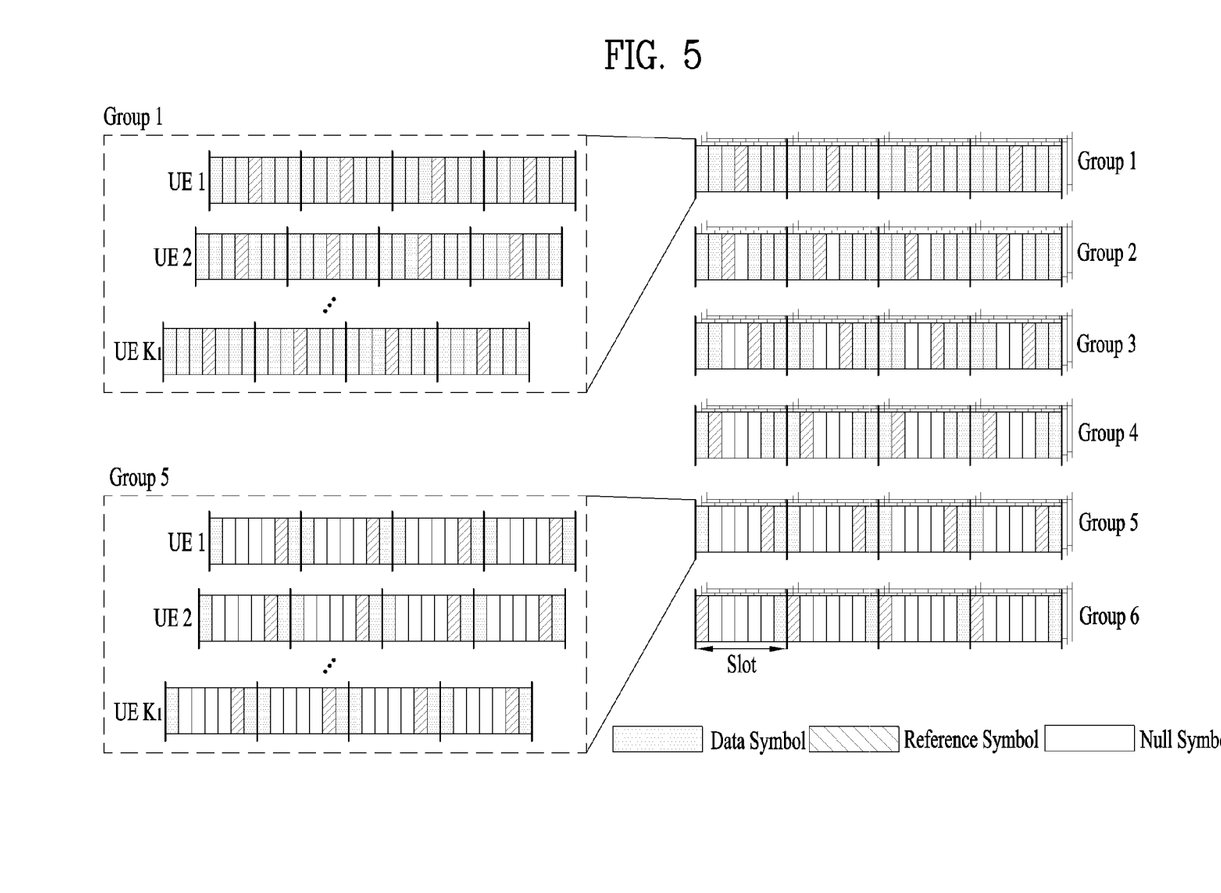
FIG. 5 is an exemplary view illustrating a frame structure of a reference signal hopping based NOMA group.

FIG. 5 is an exemplary view illustrating a frame structure of a reference signal hopping based NOMA group.

To support massive connectivity, a multiple access system that enables demodulation while supporting a maximum number of sequence based reference symbols or more is suggested. FIG. 5 illustrates a frame structure of non-orthogonal multiple access UE groups that share one frequency resource (in this case, UE groups have been determined randomly, and UE grouping method will be described in detail in the embodiment 2).

To support a maximum number of reference symbols or more, each group uses all of a maximum number of reference symbols, and reference symbols of each group are configured to avoid overlap with reference symbols of another group as illustrated in FIG. 5. For convenience of description, 3GPP LTE will be described as an example. The number of maximum UE groups may be supported up to 6 in a normal CP frame structure of FIG. 5, and may be supported up to 5 in an extended CP frame structure. At this time, since it is difficult to demodulate signals if the number of overlapped groups is increased, the number of groups which are used may be varied depending on a system environment or QoS constraint. Also, the number of maximum UEs that may be supported in one group is the same as the number of maximum sequence based reference signals. Since it is difficult to demodulate signals if the number of UEs that perform NOMA in one group is increased, the number of UEs in the same group may be varied depending on a system environment or QoS constraint. Meanwhile, a different code or transmission power may be applied to each of the UEs within the same group, whereby the base station may identify the UEs in the same group. Also, if a different code or transmission power is applied to UEs among different groups, the base station may perform decoding in a state that interference among UEs for a plurality of groups is minimized. Since the number of maximum overlaps through the above-described NOMA scheme is more than the number of maximum reference symbols, NOMA service may be supported for a plurality of groups.

For example, in FIG. 5, group 1 corresponds to a group of multiple UEs, which performs NOMA of FIG. 3, and is comprised of $K_1$. MUD performance for group 1 is reduced if the number $K_1$ of users of group 1 is increased, and is increased if $K_1$ is reduced. Also, if group 1 is only used for service, there is no interference to another group, whereby MUD performance is increased. MUD performance is reduced if the number of groups subjected to service is increased.

If reference signal hopping for a plurality of groups in FIG. 5 is performed, demodulation may be performed for reference symbols of group 1 without interference to another group, and should be performed for reference symbols of group 2 in a state that the reference symbols are interfered by data symbols of group 1. That is, reference symbols of a higher group (low order) are not interfered from symbols of a lower group (high order), and reference symbols of a lower group are interfered from symbols of the higher group. For detailed description, received signals for symbols in one slot of FIG. 5 are used as expressed by the following Equation 1.

Equation 1

$$y(1) = \sum_{g=1}^{G-1} \sum_{k=1}^{K_g} h_k^{(g)} d_k^{(g)} + \sum_{k=1}^{K_0} h_k^{(0)} P_k + n_1,$$

$$y(2) = \sum_{g=1}^{G-3} \sum_{k=1}^{K_g} h_k^{(g)} d_k^{(g)} + \sum_{k=1}^{K_4} h_k^{(1)} P_k + n_2,$$

$$y(3) = \sum_{g=1}^{G-5} \sum_{k=1}^{K_g} h_k^{(g)} d_k^{(g)} + \sum_{k=1}^{K_2} h_k^{(2)} P_k + n_3,$$

$$y(4) = \sum_{k=1}^{K_1} h_k^{(1)} P_k + n_4,$$

$$y(5) = \sum_{g=1}^{G-4} \sum_{k=1}^{K_g} h_k^{(g)} d_k^{(g)} + \sum_{k=1}^{K_3} h_k^{(3)} P_k + n_5,$$

$$y(6) = \sum_{g=1}^{G-2} \sum_{k=1}^{K_g} h_k^{(g)} d_k^{(g)} + \sum_{k=1}^{K_4} h_k^{(5)} P_k + n_6,$$

$$y(7) = \sum_{g=1}^{G} \sum_{k=1}^{K_g} h_k^{(g)} d_k^{(g)} + n_7.$$

[Equation 1]

y(m) represents a received signal of the m-th symbol in one slot, and includes a channel $h_k^{(g)}$ from the kth UE of the gth group, data symbol $d_k^{(g)}$, reference symbol $P_k$, and received noise $n_m$. G is the number of total groups, and $K_g$ represents the number of total UEs in the g-th group. Since the reference symbols $P_k$ used in the respective groups are not overlapped in a reference signal avoidance (or hopping) scheme, the same sequence may be used for the reference symbols $P_k$.

Then, the fourth symbol y(4) includes reference symbols from the first group UEs. Since a sequence set to have cross correlation of 0 or lower cross correlation if possible is used for the reference symbols of the respective UEs, auto-correlation may be performed using a self-sequence, whereby channel estimation may be performed. At this time, the maximum number of $K_1$ is equal to the maximum number of $P_k$. Data symbols from the first group UEs of y(3) may be detected based on the estimated channel information as expressed in the following Equation 2. At this time, the MUD scheme may be varied depending on NOMA scheme which is used.

Equation 2

$$\sum_{k=1}^{K_1} \widetilde{d_k^{(1)}} = \frac{y(3)}{\widetilde{h^{(1)}}} = \sum_{g=1}^{1} \sum_{k=1}^{K_1} d_k^{(1)} + \sum_{k=1}^{K_2} \frac{h_k^{(2)}}{\widetilde{h^{(1)}}} P_k + \frac{n_3}{\widetilde{h^{(1)}}}$$ [Equation 2]

In the Equation 2, $\widetilde{h^{(1)}}$ is a channel compensation term for multiple UEs of group 1. The Equation 2 may be changed in accordance with a channel compensation scheme, and a second item in a right hand side of the Equation 2 represents interference based on reference symbols from the second group users, and a third item is a changed noise value.

The third symbol y(3) includes data symbols from the first group UEs and reference symbols from the second group UEs (see Equation 3). Therefore, if the data symbols from the first group UEs are demodulated, interference for the reference symbols of the second group may be removed to perform channel estimation.

Equation 3

$$\sum_{k=1}^{K_2} h_k^{(2)} P_k + n_3 = y(3) - \sum_{g=1}^{1} \sum_{k=1}^{K_1} \widetilde{h_k^{(1)}} \widetilde{d_k^{(1)}}$$ [Equation 3]

In this case, since the data symbols from the first group UEs have been demodulated in a state that they are interfered from the reference symbols of the second group, an error for demodulation may exist. Therefore, the data symbols from the first group UEs may be detected repeatedly by reflecting channel estimation through the reference symbols of the second group. This may be expressed by the following Equation 4.

Equation 4

$$\sum_{g=1}^{1} \sum_{k=1}^{K_1} \widetilde{d_k^{(1)}} + \widetilde{n_3} = y(3) - \sum_{k=1}^{K_2} h_k^{(2)} P_k$$ Equation 4

In this way, iterative demodulation of received signals from y(1) to y(7) may be performed. If an iterative demodulation mode procedure between groups is schematized, the procedure may be expressed by the following Equation 6.

Figure 6:
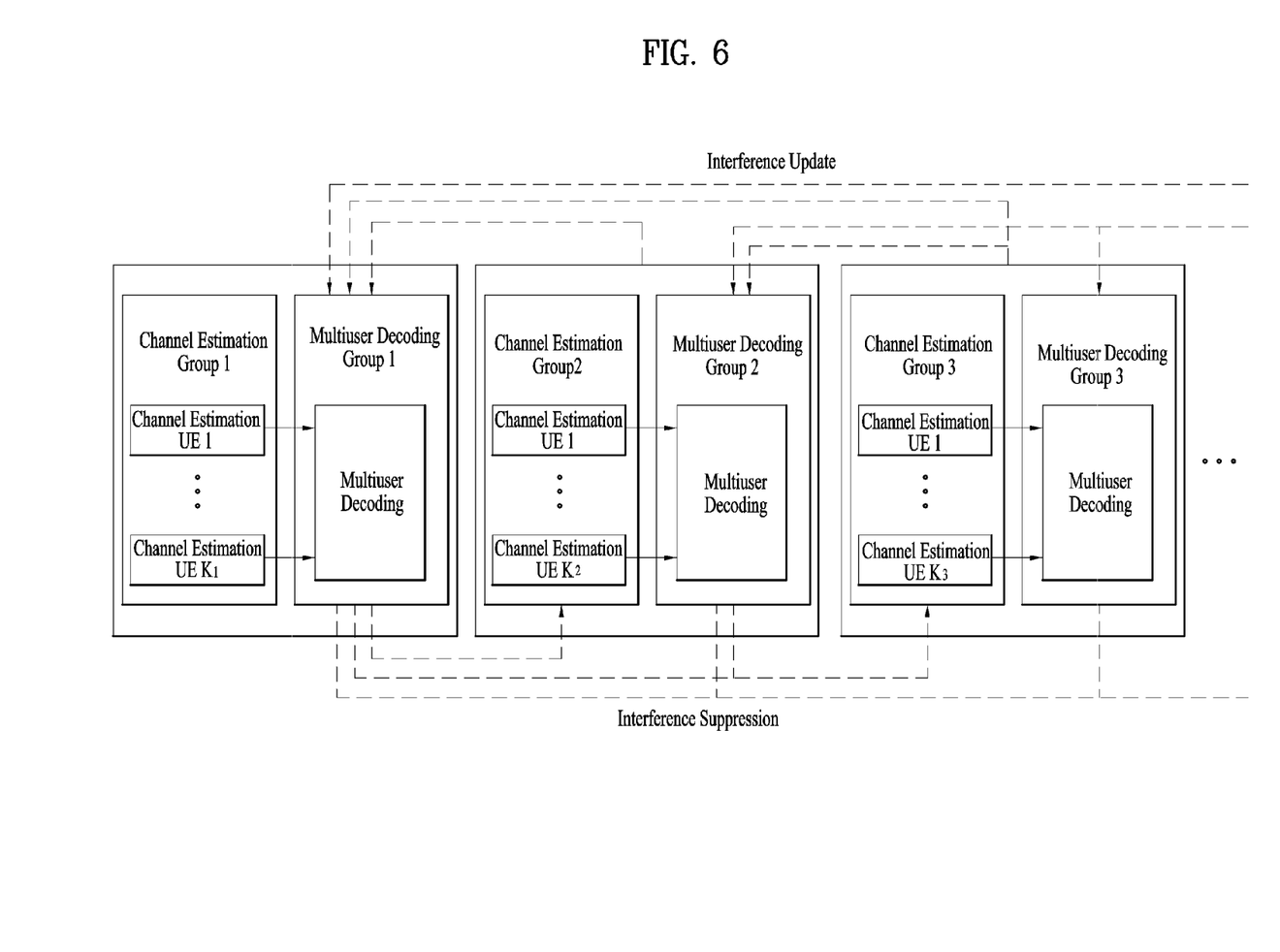
FIG. 6 is a view illustrating a procedure for iterative multi-group detection.

FIG. 6 is a view illustrating a procedure for iterative multi-group detection.

In FIG. 6, the MUD scheme of each group may be defined in various manners through a receiver that supports NOMA. For example, Maximum Likelihood (ML) detection or Maximum joint A posteriori Probability (MAP), Codeword Interference Cancellation (CWIC) of Multiuser Superposition Transmission (MUST), Massage Passing Algorithm (MPA) of Sparse Code Multiple Access (SCMA), Parallel Interference Cancellation (PIC) of Interleave Division Multiple Access (IDMA), etc. may be used. The MUD scheme of data symbols may be defined in various manners in accordance with a non-orthogonal multiple access transmission and reception design scheme.

If the suggested scheme is used, the maximum sequences of the reference signals may be multiplied as much as the number of groups to support massive connectivity. In the above scheme, a reference signal hopping pattern is as follows.

Embodiment 1: Reference Signal Hopping Pattern Based on Normal Cyclic Prefix (CP) Frame Structure FIG. 7 is a view illustrating an example of a normal CP frame structure based reference signal hopping pattern.

Figure 7:
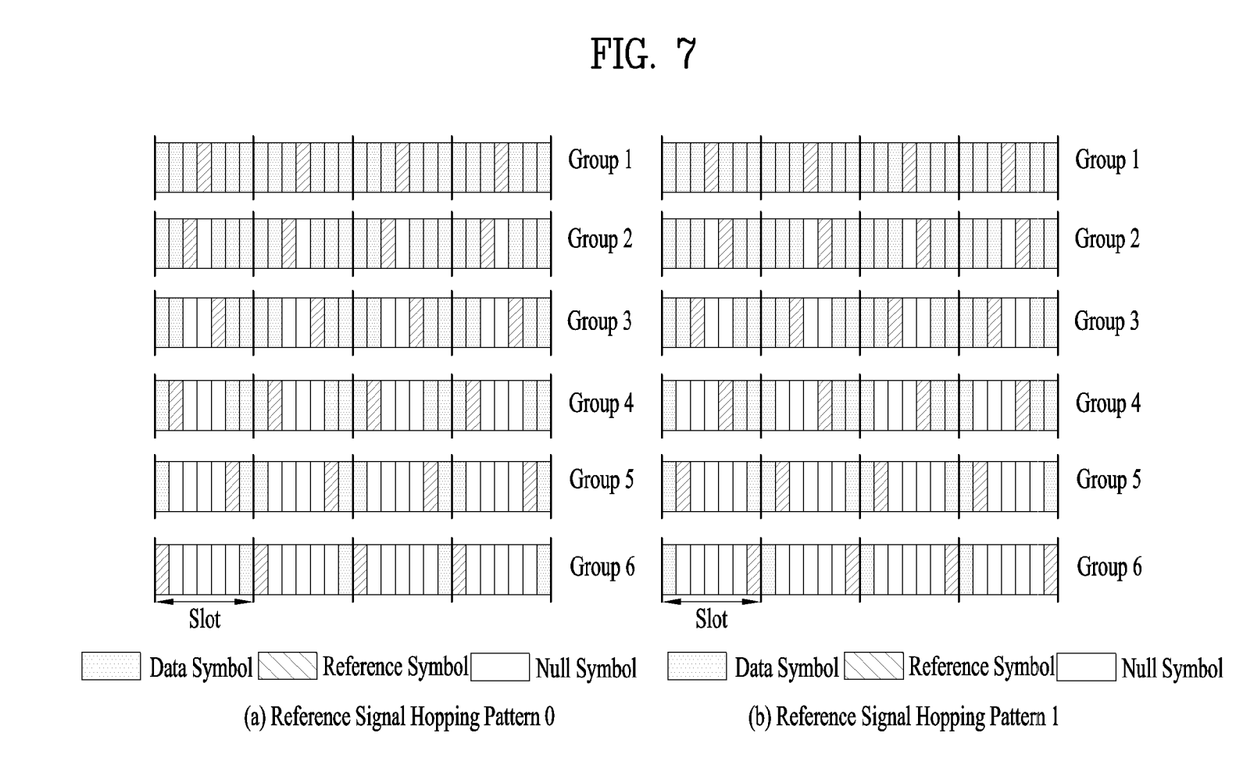
FIG. 7 is a view illustrating an example of a normal CP frame structure based reference signal hopping pattern.

FIG. 7 illustrates reference signal hopping pattern using two subframes. Block, linear and non-linear interpolations of FIG. 4 may be performed for group 1 of FIG. 7 in accordance with a system environment. On the other hand, in case of the other groups, the reference signals are not located at the center of a slot and spaced apart from data symbols, whereby performance of block interpolation may be deteriorated. Therefore, a UE may block degradation of channel estimation performance by performing block interpolation for three symbols at both sides based on the reference symbols. At this time, the UE performs channel estimation beyond slot boundary. For example, in group 4 of a reference signal hopping pattern 0 shown in FIG. 7(a), block interpolation is performed for first three symbols (a first symbol of a reference slot and sixth and seventh symbols of a previous slot) based on the reference symbols. Similarly, in group 5, block interpolation is performed for the last two symbols (a seventh symbol of a reference slot and a first symbol of next slot) based on the reference symbols.

Likewise, block interpolation may be applied to the other groups and groups of a reference signal hopping pattern 1 shown in FIG. 7(b). Alternatively, channel estimation performance may be improved through linear interpolation and non-linear interpolation.

The embodiment 1 is an example of the reference signal hopping pattern, and corresponds to another pattern that uses all of the maximum number of reference symbols in each group while allowing the reference symbols not to be overlapped, in another way.

Embodiment 2: Reference Signal Hopping Pattern Based on Extended CP Frame Structure FIG. 8 is a view illustrating an example of an extended CP frame structure based reference signal hopping pattern.

Figure 8:
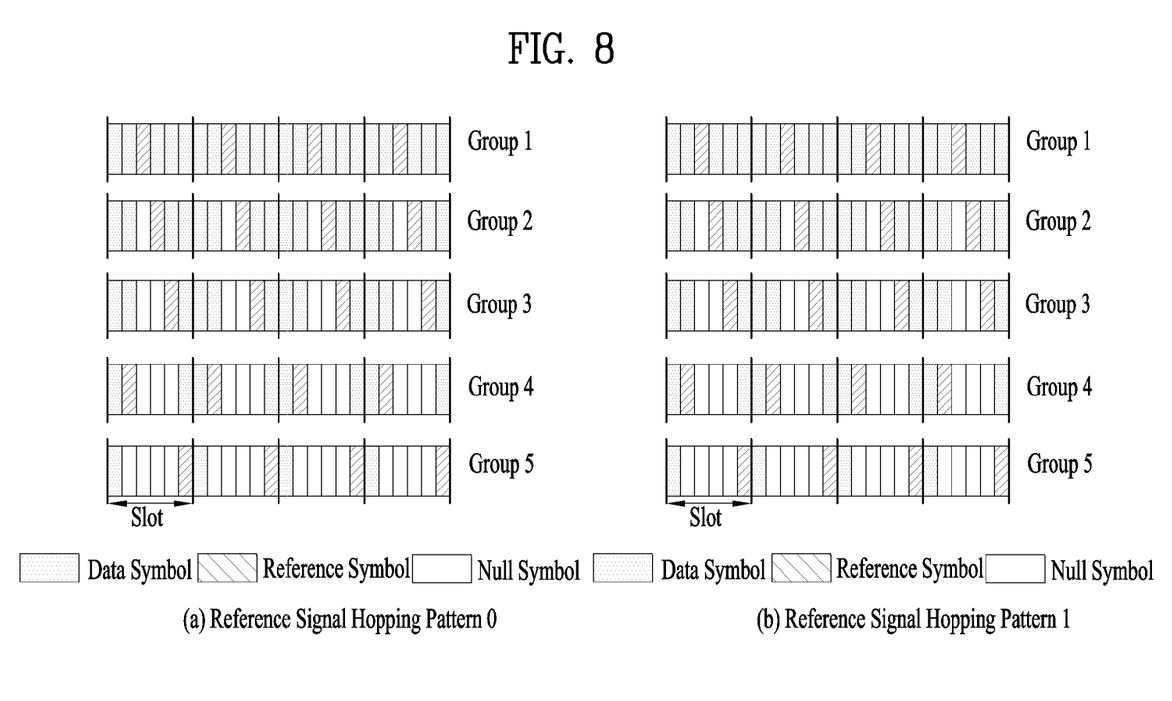
FIG. 8 is a view illustrating an example of an extended CP frame structure based reference signal hopping pattern.

FIG. 8 illustrates reference signal hopping pattern using two subframes. Block, linear and non-linear interpolations of FIG. 4 may be performed for groups 1 and 2 of FIG. 8 in accordance with a system environment. On the other hand, in case of the other groups, the reference signals are not located at the center of a slot and spaced apart from data symbols, whereby performance of block interpolation may be deteriorated. Therefore, a UE may block degradation of channel estimation performance by performing block interpolation for two symbols at a left side and three symbols at a right side based on the reference symbols. At this time, the UE performs channel estimation beyond slot boundary.

For example, in group 3 of a reference signal hopping pattern 0 shown in FIG. 8(a), block interpolation is performed for the last three symbols (a sixth symbol of a reference slot and first and second symbols of next slot) based on the reference symbols. Similarly, in group 4, block interpolation is performed for first two symbols (a first symbol of a reference slot and a sixth symbol of a previous slot) based on the reference symbols. Likewise, block interpolation may be applied to the other groups and groups of a reference signal hopping pattern 1 shown in FIG. 8(b). Alternatively, channel estimation performance may be improved through linear interpolation and non-linear interpolation.

The embodiment 2 is an example of the reference signal hopping pattern, and corresponds to another pattern that uses all of the maximum number of reference symbols in each group while allowing the reference symbols not to be overlapped, in another way.

Non-Orthogonal Multiple Access UE Group for Massive Connectivity

To perform the above-described reference signal hopping method for massive connectivity, definition and signaling of a UE grouping method of a non-orthogonal multiple access system are required.

The UE grouping method of the non-orthogonal multiple access system for performing the reference signal hopping method suggested in the reference signal hopping method for massive connectivity is suggested. In the reference signal hopping method for massive connectivity, a reference signal hopping method according to UE group has difference in demodulation performance between groups. Since reference signals of group 1 can be received without interference, channel estimation performance can be ensured, and better received performance may be expected due to differential interference of each data symbol. For example, the third symbol of group 1 in FIG. 5 has only interference from the reference symbols of group 2, and the reference symbol is information previously known, and has excellent interference cancellation performance. On the other hand, since the fifth symbol of group 2 has interference from data symbols of group 1 and interference from reference symbols of group 3, demodulation performance may be reduced. Even though iterative multi-group detection is performed, it is expected that demodulation performance is reduced in case of group having much interference. Therefore, a higher group (for example, group 1 is the most significant group) has excellent received demodulation performance, whereby data transmission may be performed at a higher MCS (Modulation and Coding Scheme) level, and a higher data rate may be expected even though the same resource is allocated. On the other hand, a lower group (for example, group 5 is the least significant group) has low received demodulation performance, whereby data transmission should be performed at a low MCS level.

Also, the higher group may transmit more data symbols, and the lower group should transmit less data symbols than those of the higher group due to usage of null symbol for reference symbol detection of the higher group. Therefore, UE scheduling and UE grouping is required considering MCS level between groups and a data transmission rate that may be provided.

Group Grouping Method 1

A base station (BS) may allocate a UE having much transmission traffic based on a required data transmission rate and a scheduling request (SR) of a UE to a higher group and allocate a UE having less transmission traffic to a lower group. In this case, the UE may transmit the amount of transmission traffic to the BS through a data channel (e.g., physical uplink shared channel (PUSCH)) by being included in a buffer status report (BSR), whereby the BS may recognize the amount of traffic. The BSR may be transmitted as a regular BSR, periodic BSR or padding BSR.

Group Grouping Method 2

The BS may configure UEs having a similar timing distance as a group in accordance with a timing distance of a UE. The timing distance may be determined in accordance with a propagation delay based on a multi-path of the UE or system environment as well as a physical distance. At this time, a UE group having a long timing distance may be allocated as a higher group to ensure a data transmission rate.

Group Grouping Method 3

The BS may group UEs on the basis of UE fairness index. Users having low UE fairness index may be allocated to a higher group to ensure fairness. At this time, fairness index may be determined based on the existing proportional fairness, or may be defined through other fairness indexes. For example, various indexes such as Jain's Fairness index and Max-min Fairness may be used. If the group grouping method suggested in the present invention is used, UE grouping fairness of the non-orthogonal multiple access system may be supported.

Hereinafter, a procedure of processing the above-described reference signal hopping pattern invention 1 for massive connectivity and UE grouping information exchange will be described.

Figure 9:
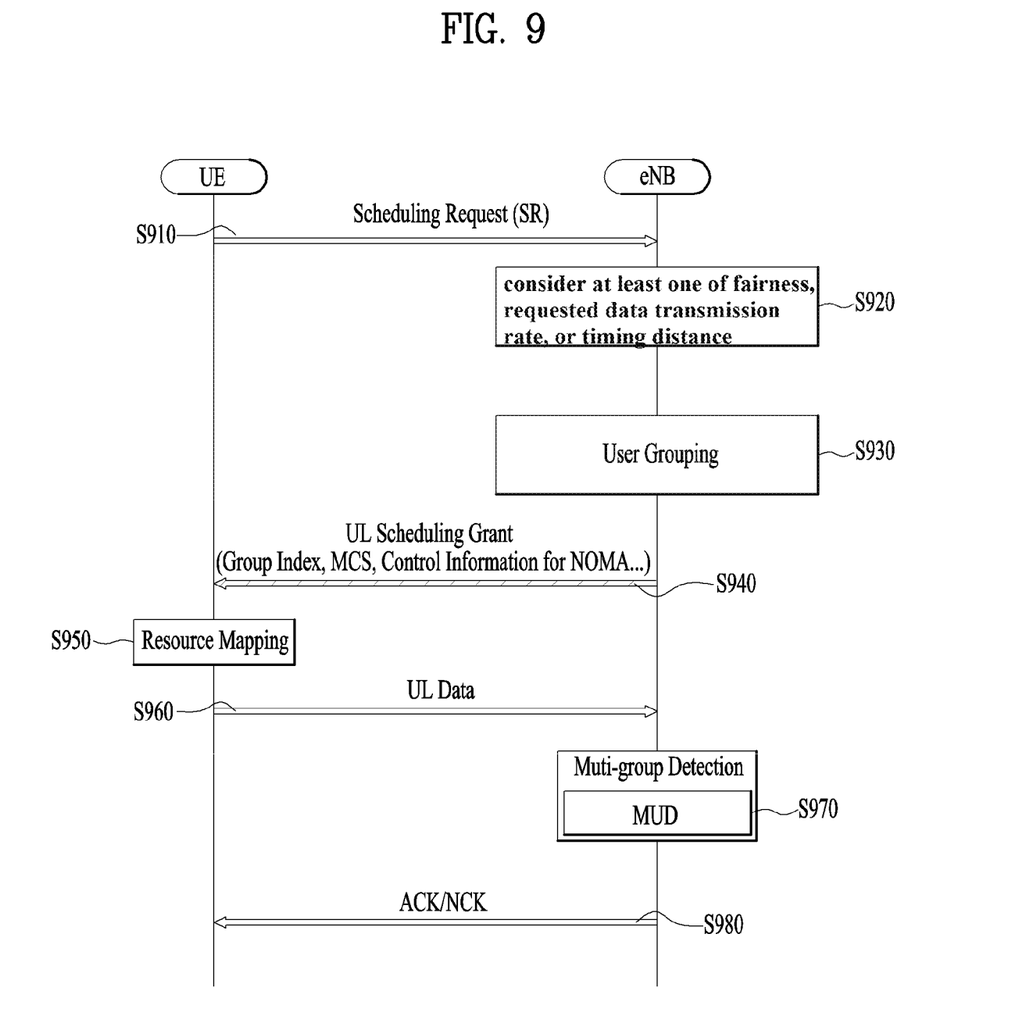
FIG. 9 is an exemplary view illustrating a procedure for massive sporadic packet services.

FIG. 9 is an exemplary view illustrating a procedure for massive sporadic packet services.

A structure of a non-orthogonal multi-group multiple access system is illustrated in FIG. 9. The UE may deliver its uplink traffic transmission request to the BS (eNB) through a scheduling request (SR) signal (S910). The BS may perform scheduling based on the above-described group grouping methods (e.g., group grouping methods 1, 2 and 3) on the basis of a channel environment of a UE and a state of another UE (S920). The BS performs UE grouping on the basis of at least one of the above-described group grouping methods (e.g., group grouping methods 1, 2 and 3) (S930). If a non-orthogonal multiple access group of the UE is determined, the BS may transmit group indexes and control information (e.g., power allocation information for MUST or codebook index for SCMA, interleaver index for IDMA, etc.), MCS level, etc. to the UE through an uplink scheduling grant (e.g., UL grant) of a control channel (e.g., physical downlink control channel (PDCCH)) unlike the legacy system (S940). In this case, the reference signal hopping pattern previously may be defined cell-specifically, or the BS may notify the UE of a reference signal hopping pattern index by including the reference signal hopping pattern in the UL grant. Also, the MCS level may be defined in a unit of group, or may be determined user-specifically.

The UE may transmit uplink data to the BS by mapping the data symbols and the reference symbols into resources on the basis of the group index included in the UL grant and resource allocation information (S950 and S960). The BS performs iterative demodulation for multi-groups and demodulates signals of multi-group multi-UEs by performing MUD in demodulation of each group (S970). The BS transmits an ACK or NACK feedback signal to the UE on the basis of the demodulated signals (S980).

As described above, the non-orthogonal multi-group multiple access system that enables demodulation while supporting the maximum number of sequence based reference symbols or more may be performed. In the present invention, it has been described that a transmission entity is a UE and a reception entity is a BS on the basis of an uplink. However, it will be apparent that the transmission entity and the reception entity may be applied to be matched with arrangement of a data channel (Physical Downlink Shared Channel, PDSCH) of a downlink and cell-specific RS.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for transmitting and receiving UE grouping information in a non-orthogonal multiple access system is industrially applicable to various wireless communication systems.

What is claimed is:

1. A method for receiving user equipment (UE) group information in a non-orthogonal multiple access scheme by a UE, the method comprising:
receiving, from a base station, UE group information including information on both a specific group including the UE and priories of UE groups,
wherein the UE groups are configured by grouping UEs share a same frequency resource based on timing distances of the UEs; and
transmitting an uplink signal to the base station via a specific time region including a reference signal symbol, one or more data symbols and zero or more null symbols,
wherein the timing distances of the UEs are determined based on a physical distance and a propagation delay of a multi-path of the UEs,
wherein the reference signal symbol is allocated in the specific time region, based on the UE group information, such that the reference signal symbol does not overlap reference signal symbols for remaining ones of the UE groups in a time domain,
wherein the zero or more null symbols are allocated in the specific time region, based on the UE group information, such that positions of the zero or more null symbols are same as positions of reference signal symbols of one or more UE groups having higher priority than the specific UE group,
wherein the reference symbols of the one or more UE groups having higher priority than the specific UE group is not interfered from the zero or more null symbols,
wherein a highest group having highest priority among the UE groups has a farthest distance based on the timing distances of the UEs, and wherein a lowest group having lowest priority among the UE groups, has a shortest timing distance based on the timing distances of the UEs.

2. The method of claim 1, wherein the UE group information further includes data transmission rates required by the respective UEs.

3. The method of claim 1, further comprising:
receiving, from the base station, a group index of the specific group, a modulation and coding scheme (MCS) index and control information for the non-orthogonal multiple access.

4. A user equipment (UE) for receiving UE group information in a non-orthogonal multiple access scheme, the UE comprising:
a receiver; and
a processor coupled to the receiver and configured to:
receive, from a base station, UE group information including information on both a specific group including the UE and priories of UE groups, wherein the UE groups are configured by grouping UEs share a same frequency resource based on timing distances of the UEs, and
transmit, to the base station, an uplink signal via a specific time region including a reference signal symbol, one or more data symbols and zero or more null symbols,
wherein the timing distances of the UEs are determined based on a physical distance and a propagation delay of a multi-path of the UEs,
wherein a reference symbol, for the specific UE group of the UE groups, is allocated in the specific time region, based on the UE group information, such that the reference signal symbol does not overlap with reference symbols for remaining ones of the UE groups, in a time domain,
wherein the zero or more null symbols are allocated in the specific time region, based on the UE group information, such that positions of the zero or more null symbols are same as positions of referencesignal symbols of one or more UE groups having higher priority than the specific UE group,
wherein the reference symbols of the one or more UE groups having higher priority than the specific UE group is not interfered from the zero or more null symbols,
wherein a highest group having highest priority among the UE groups has a farthest distance based on the timing distances of the UEs, and
wherein a lowest group having lowest priority among the UE groups, has a shortest timing distance based on the timing distances of the UEs.

5. The UE of claim 4, wherein the UE group information further includes data transmission rates required by the respective UEs.

6. The UE of claim 4, wherein the processor is further configured to:
receive, from the base station, a group index of the specific group, a modulation and coding scheme (MCS) index and control information for the non-orthogonal multiple access.

* * * * *